Nov. 12, 1935.  C. DOERING  2,020,878
CONTINUOUS BUTTER CHURN
Filed June 22, 1932  2 Sheets-Sheet 1
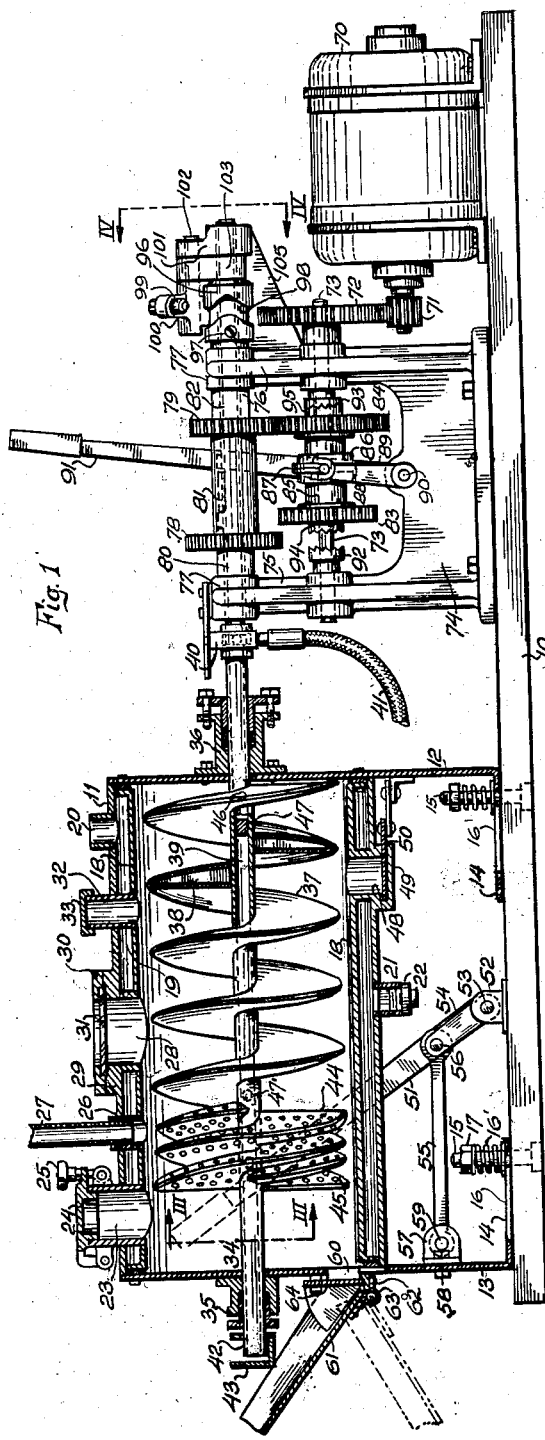
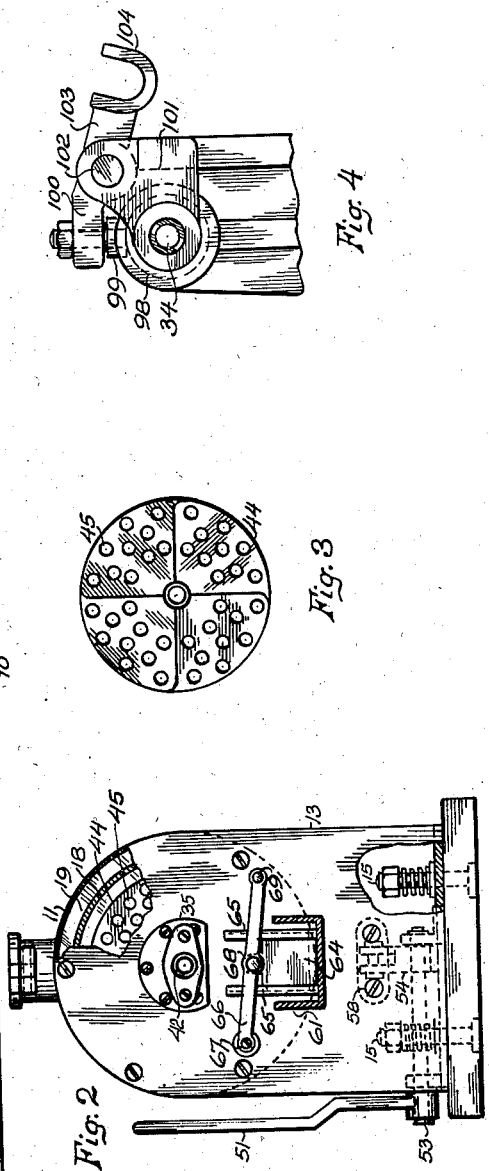
INVENTOR
CHARLES DOERING
ATTORNEY

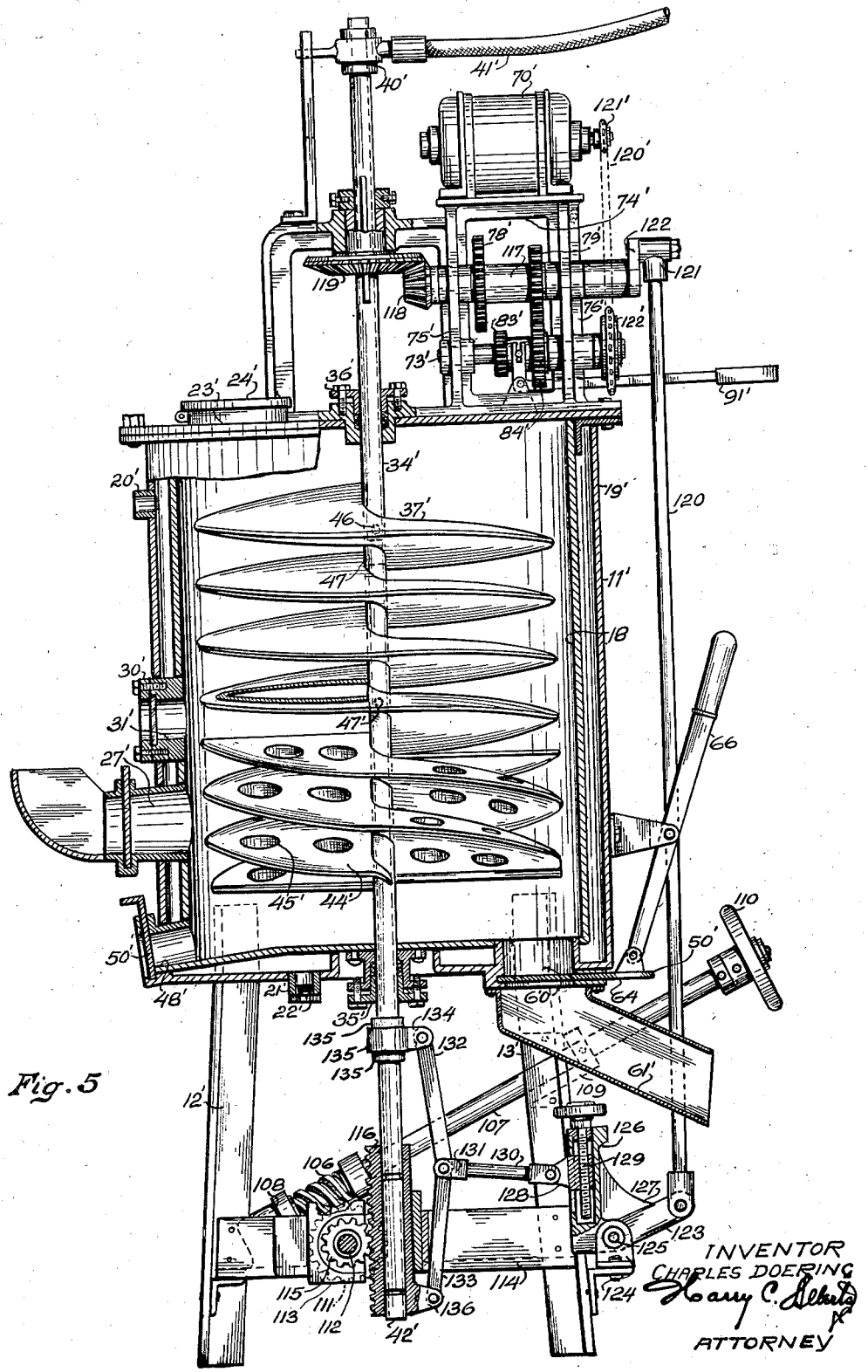

Patented Nov. 12, 1935

2,020,878

UNITED STATES PATENT OFFICE 2,020,878

CONTINUOUS BUTTER CHURN

Charles Doering, Chicago, Ill.

Application June 22, 1932, Serial No. 618,661

10 Claims. (Cl. 259—99)

This invention relates to a churning device and more particularly to continuous butter churns, although the teachings thereof may be employed with equal advantage for other purposes.

It contemplates more especially the provision of a simple and effective device for churning dairy products without entailing much labor or requiring interrupted handling in order to render such available for the market.

Numerous types of churning devices have heretofore been proposed, but these have not proven especially adaptable for continuous processing of dairy products which require utmost sanitation and varied processing in order to render such ultimately available for the market. In the case of butter the cream must be handled and churned; thereafter the buttermilk must be withdrawn and separated from the resulting product and thereafter cleansed. Consequent to cleansing, the butter is usually kneaded or worked into a homogeneous mass for placement in a tube or for processing through a machine in order to convert such into uniform units and prints varying in size from one-quarter pound to one pound. This conversion necessitates frequent handling of the product in its various stages of production, and this is not conducive to sanitation nor efficient preparation.

One object of the present invention is to simplify the construction and improve the operation of devices of the character mentioned.

Another object is to provide a device for continuously churning dairy products for ultimate conversion into marketable units without entailing much time or labor.

Still another object is to provide a novel churning device for dairy products that enables the continuous production without frequent interrupted handling in the conversion thereof into marketable units.

A further object is to provide a novelly constructed churning device which enables the continuous processing of the resulting product to impart improved characteristics thereto.

A still further object is to provide a kneading device in conjunction with a churn for continuous conversion of the raw products into plastic dairy substances.

Still a further object is to provide an improved churning device for the production of dairy products in a much more efficient manner.

Other objects and advantages will appear from the following description of an illustrative embodiment of the present invention.

In the drawings:

Figure 1 is a sectional view in elevation of a device embodying features of the present invention.

Figure 2 is a front view of the device shown in Figure 1, parts thereof being broken away to clarify the showing.

Figure 3 is a front view of the kneading device taken substantially along line III—III of Figure 1.

Figure 4 is an enlarged fragmentary view of the reciprocating device viewed substantially from line IV—IV of Figure 1.

Figure 5 is a sectional view in elevation of a modifying embodiment of the structure disclosed in Figure 1 which is designed for vertical support and operation.

The structure selected for illustration comprises a base plate 10 of any suitable construction for the support of the tank or container 11 of substantially cylindrical configuration. The tank or container 11 is supported by end plates 12 and 13 which constitute a part of the container 11 to provide standards therefor. It is to be noted that the standards 12 and 13 have normally related flanges 14 bent inwardly to approach each other, they being applied to the base plate 10 to serve as a support for the tank or container 11. The container 11 is slidably mounted, in this instance, on the plate 10 for reasons which will appear more fully hereinafter. To this end, stud bolts 15, in this instance four, extend through the base plate 10 for registry with longitudinal slots 16 provided in the flanges 14. Coiled springs 16' confront the shank of the studs 15, for fastener nuts 17 engage the threaded extremity of the studs 15 to retain the coiled springs 16' in frictional contact with the flanges 14 to preclude the vertical displacement thereof by affording slidable movement against the resistance of the frictional contact established by the springs 16'. For that reason the tank 11 may be slidably translated along the base plate 10 within the limits of the slots 16, and the position thereof is retained by the frictional urge exerted by the springs 16'.

As shown, the tank 11 has an interior cylindrical liner 18 which is concentrically arranged to define an annular chamber 19 for the reception of tempering fluids introduced through the intake orifice 20 formed along the top region of the tank 11. A discharge orifice 21 is formed along the bottom region of the tank 11 for communication with the chamber 19 thereof, it being provided with a plug 22 detachably associated therewith to enable the discharge of the tempering fluid or to afford the continuous circulation thereof as conditions may require or commercial practice may dictate.

The container 11 is filled with cream through an intake conduit 23 which projects through the chamber 19 for communication with the interior, there being a closure 24 pivoted thereto for detachable locking engagement therewith by means of the toggle fastener 25. In this manner, the cream may be poured through the conduit 23 which is preferably deposited along the longitudinal top region medial line on the tank 11 proximate to the forward end thereof. Another conduit 26 extends between the walls of the container 11 to project therefrom to receive a pipe 27 so that the tank 11 may be charged with the cream or other material direct from a tank disposed thereabove or positioned for flow of the material thereto as commercial practice may dictate for any particular installation. A sight port 28 is formed along the top region of the container 11 intermediate the extremities thereof, it terminating in a peripheral flange 29 for the reception of a closure frame 30 which is attached thereto. The closure frame 30 receives a transparent shield 31 to enable the interior of the container 11 to be viewed without opening any of the conduits 23 and 26 or resort to other indicator expedients. An air vent tube 32 extends through the tempering chamber 18 along the top region of the container 11, it being in longitudinal alignment with the charging conduit 23, the pipe 27, and the indicator port 28. A cap 33 is detachably secured to the air vent 32 to preclude the entrance of any foreign substances; however, the escape of air is permitted responsive to charging the container 11 with the material to be churned for conversion into butter or other diary products.

In order to agitate and effect churning movement of the materials confined in the container 11, a shaft 34 is journalled axially through the container 11 for support in bearings 35 and 36 attached to the end plates 12 and 13. A helical conveyor 37 is fixed to the shaft 34 to occupy substantially the diametral extent of the container 11 in order to impart desired movement to the materials with which the container is charged. As shown, the conveyor 37 comprises a plurality of convolutions which are preferably chambered to present a tubular interior 38 for the reception of a tempering fluid circulated therethrough for communication with the interior 39 of the shaft 34. The shaft interior 39 has a coupler 40 fixed to one extremity thereof for communication with a water supply pipe or hose 41 which charges the shaft 34 as well as the chamber interiors 38 of the conveyor convolutions 37. The discharge of the water is effected through the other extremity 42 of the shaft 34 which leads to a trough 43 for conveying the tempering fluid to a waste drain or return such to the pump for re-circulation as conditions may require or deem most practical.

A kneading device for the product which results from the churning of the materials supplied in the container 11 is provided on the forward end of the shaft 34 just ahead of the conveyor 37. The kneading device comprises, in this instance, a plurality of convolutions 44 which defines a helix fixed to the shaft 34 similarly to the convolutions of the conveyor 37, these being of solid construction and having a plurality of perforations 45 extending through the face of the blades or convolutions 44 to permit the material of the resulting product to extrude therethrough. In consequence thereof, the material will be worked and the particles extruded through the perforations 45 so as to finally divide the mass into particles and effect the homogenization thereof so that the constituents thereof are uniformly blended and distributed.

It is to be noted that the tempering fluid passes through the rearward end portion of the shaft 34 and enters the first convolution of the conveyor 37 through the aperture 46 which is in communication with the chambered interior thereof. The plug 47 is provided within the shaft 34 so as to preclude the passage of the tempering fluid entirely therethrough. Similarly, the last convolution of the conveyor 37 communicates with the interior 39 of the shaft 34 through the aperture 47' so as to effect the discharge thereof for ultimate passage along the trough 43, there being no circulation of the tempering fluid through the convolutions of the kneading device 44.

The liquid residue that remains after the materials are churned to a substantially solid mass, is drawn off or discharged through a port 48 which extends through the chambered walls of the container 11 along the bottom region thereof, it being provided with an enlarged peripheral flange 49 for the reception of a sliding gate valve 50 which regulates the flow of the residue from the interior of the container 11 to a vat or other receptacle for ultimate use as a by-product. In the case of churning cream which results in butter, the residue is termed buttermilk and such is drained for collection and ultimate sale on the market as a by-product of butter. Then, too, the churn dairy plastic is washed by turning the flow of water or other cleansing fluid through the intake conduit 27 for subsequent discharge through the port 48 when the gate valve 50 is displaced to its open position. Any suitable control means may be employed to operate the gate valve 50.

In order to work or knead the resulting product which accumulates proximate to the forward end of the container 11, the helical conveyor 37 together with the working helix 44, is axially displaceable relative thereto. This is accomplished by means of a lever 51 which is pivoted to a yoke 52 fixed to the base plate 10, there being a stud shaft 53 extending through the yoke 52 for attachment to the lever 51. A lever crank 54 is fixed to the stud shaft 53 for connection to a link 55 by means of a pivot 56. The link 55 has the other extremity thereof connected to a yoke 57 attached to the forward standing 13 of the container 11 by means of fasteners 58. Pivot pins 59 extend through the yoke 57 for attachment to the link extremity 55 thereby operatively connecting the lever 51 to the container tank 11 which is axially displaceable responsive to the pivotal manipulation thereof. In consequence, the lever 51 may be pivoted in a clockwise direction in order to displace the container 11 rearwardly relative to the conveyor 37 and its kneading portion 44.

This longitudinal rearward movement of the container 11 relative to the shaft 34 brings the kneading helix 44 in direct contact with the products resulting from the churning operation. In fact, the helix 44 presses thereagainst to force the substance through the apertures 45 provided in the blades thereof, thereby homogenizing and otherwise breaking down the particles to assume a very smooth and uniform texture. During the displacement of the container 11 relative to the shaft 34, the latter keeps on rotating so as to accomplish the end of complete homogeneity. Then, too, salt and other substances are incorporated in the container 11 so as to distribute such uniformly through the churned mass responsive to the rotation of the kneading device 44 in direct contact therewith. This finally divides the mass into a uniform and velvety consistency prior to its discharge through an opening 60 provided in the forward wall 13 of the container 11 proximate to the bottom thereof. A chute 61 communicates with the discharge opening 60, it being pivoted to a bracket 62 by means of a pin 63 for adjustable pivotal movement. A closure 64 is slidably associated with the container 11 for selectedly obstructing the discharge opening 60, it being arranged for removal when the chute 61 is gravitated in a counter-clockwise direction (viewed from Figure 1) to its operative position for conducting the churned mass to a machine or other device for continued processing thereof. As shown, the closure 64 is guided by vertical brackets 65 for vertical movement. A lever 66 is pivoted to the forward face 13 of the container 11 as at 67 with the closure 64 connected thereto intermediate the extremity thereof by means of a pin 68. Consequently, the closure 64 may be elevated or lowered responsive to the manipulation of the free extremity 68 of the lever 69.

In practice, the chute 61 may lead to the hopper of a print machine for conversion into bricks or units of any desired size or configuration. It is to be noted that when the container 11 is displaced relatively to the conveyor 47, this displacement is guided by the slot 16, and the frictional reaction exerted by the springs 16' on the bolt 15 to maintain the parts in their slidable adjusted position. In order to rotate the shaft 34, an electric motor 70 is fixed to the base plate 10 for support thereon. The motor 70 has the armature thereof provided with a pinion 71 which meshes with a gear 72 carried by a shaft 73. The shaft 73 is journalled in bearings carried by a standard 74 having upstanding confronting arms 75 and 76. The shaft 34 has an extension thereof journalled in bearings 77 carried by the arms 75 and 76 for journalled support in parallelism with the shaft 73.

A pair of gears 78 and 79 are fixed to the extension of the shaft 34 between the bearing standards 75 and 76, there being spacer collars 80, 81 and 82 provided on the shaft extension for maintaining the gears 78 and 79 against any possible displacement. As shown, the gear 78 is larger in diameter than the gear 79, and these mesh with complemental gears which are fixed to a sleeve 85 journalled on the shaft 73. An annular shoulder 86 is formed on the sleeve 85 to carry diametrically opposed pins 87 for engagement with a yoke 88 formed on a bell crank 89 pivoted to the support 74 as at 90. A lever 91 is anchored to the pin 90 for pivoted movement with the bell crank 89 so as to displace the sleeve 85 together with the gears 83 and 84 along with the shaft 73. Clutch elements 92 and 93 are fixed to the shaft 73 for rotation therewith, these being positioned adjacent the standards 75 and 76, respectively, for detachable engagement with complemental clutch elements 94 and 95, respectively. The clutch elements 94 and 95 constitute the hubs of gears 83 and 84 for rotation therewith. Consequently, the displacement of the sleeve 85 so that one or the other of the gears 83 and 84 are in meshing engagement with the gears 78 and 79, will bring the clutch elements 94 and 95 to engage with their corresponding parts 92 and 93 fixed for rotation with the shaft 73. By so doing, the speed of rotation of the shaft 34 may be varied responsive to the control of the attendant by manipulating the lever 91. In either event, the shaft 34 will rotate responsive to the motor 70. In order to reciprocate the shaft 34 relative to the container 11 to impart much more effective agitation, a cylindrical cam 96 is fixed to the extension of the shaft 34 proximate to the extremity thereof, there being a set screw 97 provided therethrough for that purpose. A cam groove 98 is formed on the surface of the cylindrical cam 96 so as to guide a cam follower 99 carried by an arm 100 pivotally connected to a bracket 101 by virtue of a pin 102.

The bracket 101 is fixed to the extension of the shaft 34 so that the engagement of the follower 99 with the cam groove 98 will effect the reciprocal translation of the shaft 34 during and responsive to the rotation thereof. Another arm 103 is pivoted to the bracket 101 by means of the pivot 102, and the extremity thereof is U-shaped for pivotal translation and engagement with a rod or other complement formed in a web 105 constituting a part of the standard 76. By pivoting the arm 103 in a counter-clockwise direction (viewed from Figure 4) so that the U-shaped extremity 104 will engage a stationary part of the frame 105 as a result the shaft 34 will be maintained against displacement when the cam follower 99 is removed from its groove 98.

In the modified embodiment of the invention, the container 11' is disposed in erect position for support by the standards 12' and 13'. The shaft 34' is vertically journalled in the bearings 35' and 36' fixed to the ends of the container 11'. The fresh material such as cream is supplied to the intake port 23' and drained through the discharge port 48' for removal to a vat or any other storage unit. The indicator port 31' is disposed through the side wall of the container 11' immediately above another port 27' which is provided with a funnel or other suitable hopper construction to guide the dry materials such as salt or other constituents added to the churned substances. A discharge opening 60' is situated proximate to the bottom of the container 11' on the side opposite to the by-product discharge opening 48', there being a closure 64' provided thereon for controlling the discharge therethrough. The conveyor 37' is fixed to the shaft 34', it being of tubular construction for the passage of the tempering fluid supplied therethrough from a conduit 41' in communication with the top extremity of the shaft 34'. The kneading helix 44' is also fixed to the shaft 34' below the conveyor 37', it having the apertures 45' provided therethrough for the same purpose set forth in connection with the embodiment disclosed in Figure 1. The shaft 34' with its auxiliary parts such as the conveyor 37' and kneading device 44' is displaced relative to the container 11' in an axial direction by virtue of a worm 106 fixed to a rod 107 journalled in an inclined position in bearings 108 and 109 supported by standards 12' and 13'. The rod 107 has a wheel 110 provided at the extremity thereof for ready access to rotate the worm 106 which meshes with a worm wheel 111 carried by a shaft 112 journalled in bearings 113 fixed to a cross member 114 extending between the standards 12' and 13'. A gear 115 is fixed to the stub shaft 112, it meshing with a rack 116 carried by a shaft 34'. In consequence thereof, rotation of the rod 107 will translate the shaft 34' in a direction axially of the container 11'.

The motor 70' is, in this instance, supported on top of the container 11' which carries the bearing bracket 74' for that purpose. The bracket 74' has the standards 75' and 76' serving as supports for the motor 70' as well as carrying parallel shafts 73' and 117, the latter serving in a capacity to the extension of the shaft 34 in the embodiment disclosed in Figure 1. Gears 78' and 79' are fixed to the shaft 117 and complemental gears 83' and 84' are fixed to the shaft 73'. A beveled pinion 118 is fixed to the extremity of the shaft 117 to mesh with a beveled gear 119 fixed to the shaft 34' so that rotation may be imparted thereto responsive to the motor 70' which has a sprocket chain 120' in meshing engagement with sprockets 121' and 122' fixed to the motor shaft and stub shaft 73'. A lever 91' is resorted to for shifting the gears 83' and 84' in much the same manner as in the preceding embodiment to change speeds.

Reciprocal movement is imparted to the shaft 34' by means of a rod 120 which has a coupler 121 at one extremity thereof for journalled connection with a crank 122 fixed for rotation with the shaft 117. The other extremity of the rod 120 is pivoted to a link 123 pivotally connected to a bracket 124 by means of a pin 125. A bell crank 126 is pivoted to the bracket 124 with an ear 127 formed thereon in connection with the link 123 through its pivotal connector with the rod 120 to impart rocking movement thereto. A follower 128 projects through a slot formed in the bell crank 126 for slidable movement along the length thereof, there being a threaded stud 129 provided therein for connection with the follower 128 to adjust and maintain the position thereof relative to the pivot 125. A link 130 is pivotally connected to the follower 128, it terminating in the yoke 131 to receive a pair of links 132 and 133 which are pivotally connected thereto. The link 132 is connected to a boss 134 formed on a collar 135 fixed to a collar slidably mounted on the shaft 34'. The link 133 is pivoted to an ear 136 formed on the rack 116 so that the rocking or oscillatory movement of the bell crank 126 will impart reciprocal movement to the shaft 34'. The extent of reciprocation is controlled by the threaded stud 129 which regulates the position of the follower 128 with respect to the pivot 125.

Various changes may be made in the embodiment of the invention herein specifically described without departing from or sacrificing any of the advantages of the invention as defined in the appended claims.

I claim:

1. In a butter making churn for dairy products, the combination with a substantially cylindrical container, of means on said container for enabling the charging and discharging of materials, a shaft journalled for rotation in said container, an agitator carried by said shaft and extending for a lesser length than the interior of said container to afford reciprocation therein for a fractional length of said agitator, means for rotating said agitator, and means for reciprocating said agitator for a fractional distance of its length during the rotation thereof for churning in effecting the conversion of liquids into dairy plastics.

2. In a butter making churn for dairy products, the combination with a substantially cylindrical container, of means on said container for enabling the charging and discharging of materials, a shaft journalled for rotation in said container, an agitator carried by said shaft and extending for a lesser length than the interior of said container to afford reciprocation therein for a fractional length of said agitator, means for rotating said agitator, and means for displacing said agitator for a fractional distance of its length in an axial direction relative to said container for churning in effecting the conversion of liquids into dairy plastics.

3. In a butter making churn for dairy products, the combination with a substantially cylindrical container, of means on said container for enabling the charging and discharging of materials, a shaft journalled for rotation in said container, a helical agitator conforming to the interior of said container, said agitator being carried by said shaft and extending for the major portion of said container length, and means for rotating said agitator and effecting reciprocation for a fractional distance of its length for conversion of liquids into dairy plastics.

4. In a butter making churn for dairy products, the combination with a substantially cylindrical container, of means on said container for enabling the charging and discharging of materials, a shaft journalled for rotation in said container, an agitator carried by said shaft, and extending for the major portion of said container, means for rotating said agitator, means for displacing said agitator for a fractional distance of its length in an axial direction relative to said container so as to traverse the normally unoccupied portion thereof, and means for holding said agitator in the relatively displaced position thereof.

5. In a butter making churn for dairy products, the combination with a substantially cylindrical container, of means on said container for enabling the charging and discharging of materials, a shaft journalled for rotation in said container, an agitator carried by said shaft, means for rotating said agitator, a kneading member on the extremity of said agitator, and means for reciprocally displacing said agitator and kneading member for a fractional distance of their length within said container to work the churned plastic dairy product prior to the discharge thereof, said agitator and kneading member extending for a major portion of said container.

6. In a butter making churn for dairy products, the combination with a substantially cylindrical container, of means on said container for enabling the charging and discharging of materials, a shaft journalled for rotation in said container, an agitator carried by said shaft, means for rotating said agitator, a kneading member on the extremity of said agitator to extend for a major distance of said container interior to work the churned plastic dairy product, and means for displacing said agitator and kneading member relative to said container for a fractional distance of their combined length to bring said kneading member in operative range of the churned products.

7. In a butter making churn for dairy products, the combination with a substantially cylindrical container, of means on said container for enabling the charging and discharging of materials, a shaft journalled for rotation in said container, a helical agitator carried by said shaft, a helical kneading member fixed to said shaft in end attachment with said agitator, the combined length of said agitator and kneading member extending for substantially the container length, and means for rotating and reciprocating said agitator for a fractional distance of said combined agitator and kneading member length.

8. In a butter making churn for dairy products, the combination with a substantially cylindrical container, of means on said container for enabling the charging and discharging of materials, a shaft journalled for rotation in said container, a helical agitator carried by said shaft, a helical kneading member fixed to said shaft in end attachment with said agitator to substantially conform in diameter with the interior of said container, means for displacing said agitator relative to said container to bring said kneading member in operative range of the churned products, and means for rotating and reciprocating said agitator and kneading member for a fractional distance of their combined length.

9. In a butter making churn for dairy products, the combination with a substantially cylindrical container, of means on said container for enabling the charging and discharging of materials, a shaft journalled for rotation in said container, an agitator carried by said shaft and extending for a greater portion of said container, means for rotating said agitator, means for reciprocating said shaft during the rotation thereof to displace said agitator for a fractional distance of its length, and means for varying the extent of reciprocation of said shaft with said agitator thereon.

10. In a butter making churn for dairy products, the combination with a container, of means on said container for enabling the charging and discharging of materials, a shaft journalled for rotation in said container, a helical agitator carried by said shaft, a helical kneading member having apertures therein fixed to said shaft in end attachment with said agitator, said agitator and kneading member extending for substantially the entire length of said container, means for rotating said agitator, and means for displacing said agitator relative to said container to bring said kneading member in operative range of the churned products.

CHARLES DOERING.